358-69.    OR    2,771,503    SR
SEARCH ROOM
T 6532

COLOR TELEVISION SYSTEM

Filed Oct. 25, 1954    3 Sheets-Sheet 1

INVENTOR.
James W. Schwartz
BY
[signature]
ATTORNEY

Nov. 20, 1956 J. W. SCHWARTZ 2,771,503

COLOR TELEVISION SYSTEM

Filed Oct. 25, 1954 3 Sheets-Sheet 2

INVENTOR.
James W. Schwartz
BY
[signature]
ATTORNEY

INVENTOR.
James W. Schwartz
BY
[signature]
ATTORNEY

United States Patent Office 2,771,503

Patented Nov. 20, 1956

2,771,503

COLOR TELEVISION SYSTEM

James W. Schwartz, Princeton, N. J., assignor to Radio Corporation of America, a corporation of Delaware Application October 25, 1954, Serial No. 464,500

15 Claims. (Cl. 178—5.4)

This invention relates to color television and more particularly to methods and arrangements for the reproduction of images in substantially their natural color.

It has been previously proposed to reproduce an image, in color, by causing a beam of electrons to repeatedly impinge upon different color light producing elements. The beam of electrons then may be sequentially intensity modulated with signals representative of each of the different light colors as it is deflected over the different color light producing elements. The intervals of beam modulation with a particular signal must correspond to the intervals during which the beam impinges on a particular color light producing element. Such a system requires accurate controlling of the electron beam intensity modulation with respect to beam position such that the interval during which a color light producing element of a particular color is being excited will repeatedly coincide with the interval during which like color signals modulate the electron beam.

The present invention in its more general form applies to a color television receiver wherein an electron beam repeatedly impinges upon various light producing elements on a target electrode, and is a method and apparatus for applying to the electron beam during a particular time, a signal which is representative of a color which coincides with the color produced by the light producing element on which the beam is impinging during the particular time. The system utilizes certain strip-like signal generating elements placed on the target electrode. The signal generating elements are so constructed as to be of at least two different areas. A device is provided for sensing a control signal generated by the signal generating elements and forming therefrom an electrical control signal which varies accordingly. Certain frequency multiple components of the control signal are then utilized to control the application of the particular color representative signals to the electron beam. Certain frequency components of the control signal are also combined to produce a restoration signal which is used as a fine control to adjust the interval of the application of the color signals to the electron beam, with respect to the position of the electron beam on the target electrode.

An object of this invention is to provide an improved color television image reproducing system.

Another object of this invention is to provide an improved electron beam controlling system by means of which an electron beam may be caused to excite a series of light producing strips according to the reception of video signals representing the colors reproduced respectively by said strips.

A further object of the invention is to provide a color television image reproducing system in which a multicolor kinescope is used having a vertically aranged light phosphor strip screen in which is incorporated facilities for generating signals by which to control the intensity modulation of an electron beam, with respect to the electron beam position.

Other and incidental objects of this invention will be apparent to those skilled in the art from reading the following specification and on inspection of the accompanying drawings in which.

Figure 1:
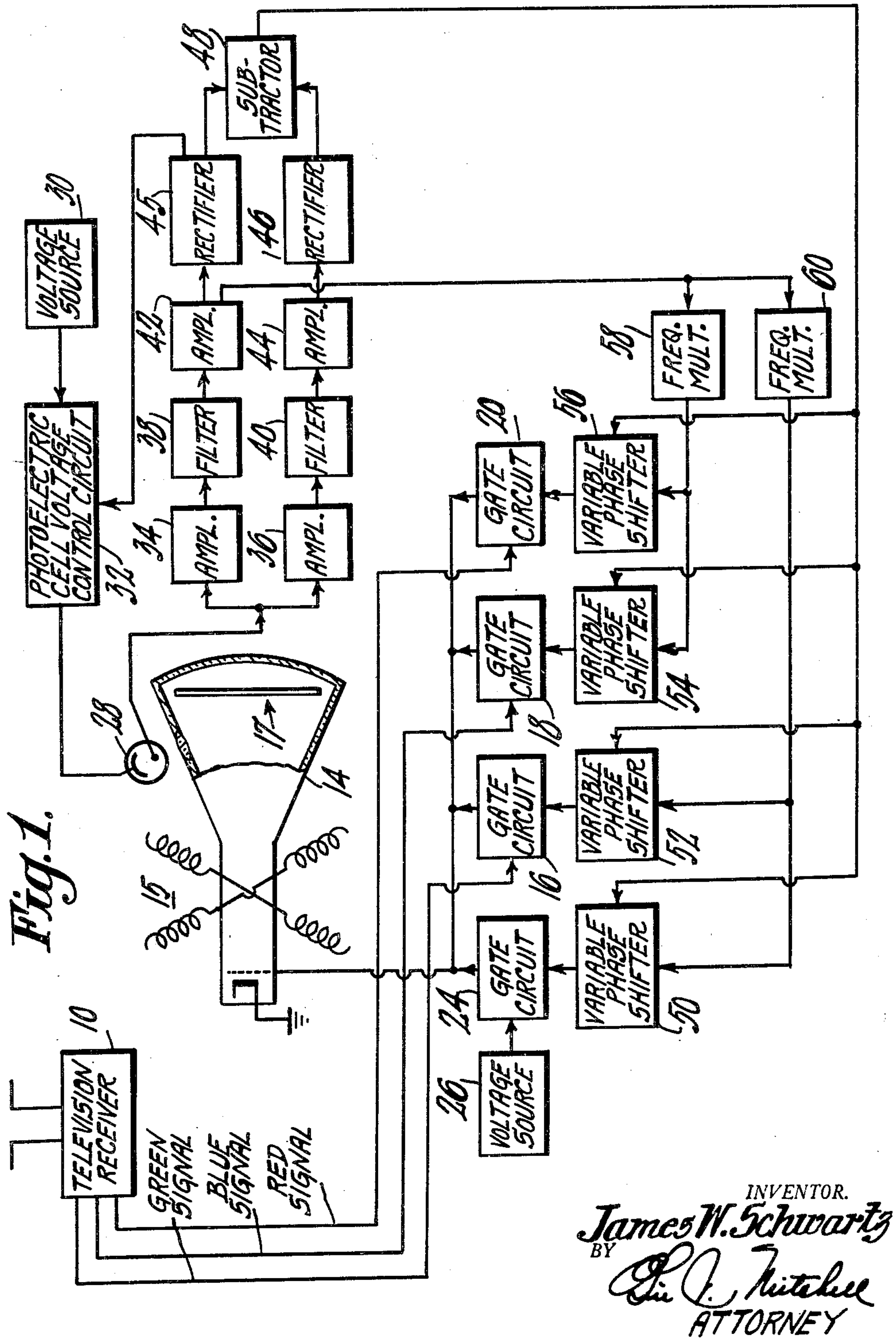
Figure 1 shows a block diagram representation of a form of the invention.

Referring now to Figure 1 there is shown a television receiver 10 which is utilized for receiving a television signal and forming therefrom three image component color signals. The color signals being a green signal, a blue signal and a red signal. A television receiver for deriving such signals from a received color television signal is shown and described in "Radio Televison News" May 1954, in an article entitled, "Fundamentals of Color Television" by Milton S. Kiver. The color signals green, blue and red are applied respectively to a series of gate circuits 16, 18 and 20 wherein their application to a control grid 22 of a kinescope i. e., image reproducing tube 14 is controlled to repeatedly intensity modulate an electron beam with different of the color signals. A further gate circuit 24 is also connected to the grid 22 to periodically apply an unvarying voltage from a voltage source 26 to the grid 22. The time of application of the unvarying voltage to the grid 22 is substantially during the period utilized to generate the control signal. The image reproducing tube 14 is provided with deflection coils 15, and other necessary circuitry such as to cause an electron beam within the tube 14 to scan a raster pattern on a target electrode 17 (later described), positioned within the tube 14.

A photoelectric cell 28 is positioned in a window of the tube 14 for selectively receiving ultra-violet wavelength light radiations from within the tube 14. The voltage is supplied to the photoelectric cell voltage control circuit 32. The signals formed by the electric cell 28 are amplified in amplifiers 34, and 36 and are then selectively filtered in frequency selective filters 38 and 40. The signals passed by the filters 38 and 40 are further amplified in amplifiers 42 and 44 after which they are rectified by 45 and 46. A rectified signal from the rectifier 45 is connected to control the photoelectric cell voltage control circuit 32. Rectified signals from the two rectifiers 45 and 46 are subtracted in a subtractor circuit 48 and are thence coupled to control variable phase shifters 50, 52, 54 and 56. The variable phase shifters 50, 52, 54, and 56 receive signals which are to be phase shifted, from the amplifier 42, after the signals have been frequency multiplied by either frequency multiplier circuits 58 or 60. The variable phase shifters 50, 52, 54 and 56 thus supply the gating signals to the gate circuits 24, 16, 18, and 20.

Figures 2A, 2B:
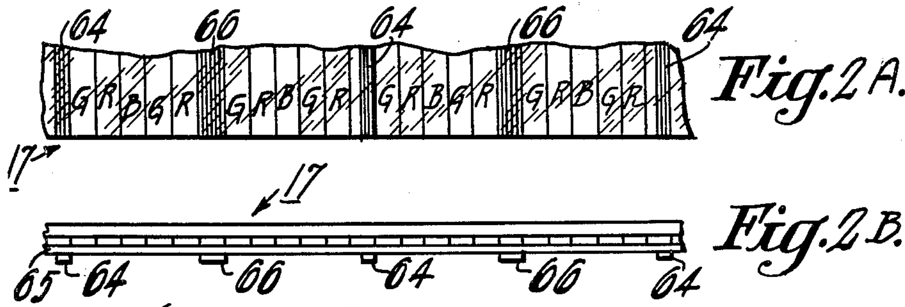
Figures 2A and 2B show views of a form of a screen to be used in the kinescope of a system of the invention shown in Figure 1.

The screen 17 of the tube 14 is shown in Figures 2A and 2B in two different views. Color light producing elements G, R, and B are interlaid alternately, however, every other of the blue light producing elements B, has substituted therefor either a full or a half width signal generating element which may be of any of the well known signal generating materials as light emissive material secondary electron emissive material or electron conductive material. Ultra violet light emitting phosphor is used in the system of Figure 1. The elements 64 are, therefore, half width ultra violet light emitting phosphor elements, and the elements 66 are full width ultra violet light emitting phosphor elements. A light-reflecting electron-transparent layer 65 preferably of aluminum separates the ultra violet signal generating phosphors from the visible light producing phosphor strips R, B, and G. As taught by Leverenz in U. S. Patent No. 2,310,863, when the phosphor light producing elements which are to make up the different groups are to emit blue, green and red light respectively, the materials of which the elements are composed may comprise: silver-activated zinc sulfide and zirconium silicate for the blue elements B, alpha-willemite activated with manganese or zinc cadmium sulfide activated with silver for the green element G. Chromium-activated aluminum berylliate or zinc cadmium sulfide activated by silver for the red lines R. The ultra violet light emitting phosphor material used to form the signal generating elements, i. e., ultra violet light emitting elements may be calcium magnesium silicate activated with cerium.

In regard to the operation of the system shown in Figure 1, the television receiver 10 by applying the color signals to the grid 22 of the tube 14, will cause the electron beam passing the grid 22 to be intensity modulated in accordance with the light intensity of the particular color desired to be reproduced at a particular instant. For example, during the time when the electron beam is impinging upon a green light producing element G, the beam must be modulated with a signal representative of the intensity of green light in the image in the particular area on which the beam is impinging.

The gate circuits 16, 18, 20 and 24 are connected to the grid 22 in such a manner as to, at substantially the proper time, key, i. e., allow the application, the color signals, green, blue and red, or the constant potential signal from the voltage source 26.

The photoelectric cell 28 forms an electrical control signal which varies as the electron beam impinges upon the ultra violet light emitting elements 64 and 66 during a scanning period. During the interval intended when the electron beam in the tube 14 is intended to impinge on the ultra violet light producing elements, the beam is held at a substantially constant intensity. The unvarying intensity of the beam during this period is effected by causing the gate circuit 24 to gate an unvarying potential from the voltage source 26 onto the grid 22.

The photoelectric cell 28 generates an electrical control signal which varies as the ultra violet light signal from the screen 17 of the tube 14, and which does not substantially contain any of the video signals due to the constant intensity of the beam during excitation of the ultra violet light emitting elements 64 and 66. After the control signal is amplified by the amplifiers 34 and 36 the filters 38 and 40 select certain frequency components from the control signal. Filter 38 selects a signal which shall be referred to as the first harmonic signal of the control signal and which varies in periodicity as the full width ultra violet light emitting elements 66 are encountered by the scanning beam. Each full width element 66 scanned by the electron beam forming a single cycle of the first harmonic signal. Filter 40 is selective to pass a signal which shall be called the second harmonic signal of the control signal and which varies as twice the periodicity of the signal emitted from the full width ultra violet emitting elements 66, having a frequency of twice that of the first harmonic signal.

The first harmonic signal after being amplified in the amplifier 42 is connected to the frequency multiplier circuits 58 and 60. The frequency multiplier circuit 58 multiplies the frequency of the first harmonic signals by two, whereas the frequency multiplier circuit 60 multiplies the first harmonic signal by four. It may therefore be seen that the gate circuit 18 and the gate circuit 24 receive a gating voltage which varies as twice the first harmonic, whereas the gate circuit 16 and the gate circuit 20 receive a gating voltage which varies as four times the first harmonic.

Figure 3:
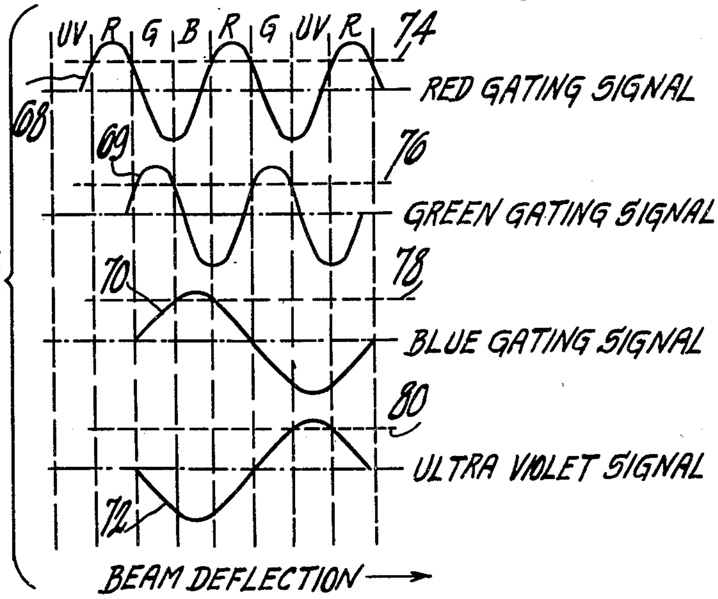
Figure 3 shows various curves representing certain wave forms generated within the system shown in Figure 1.

A consideration of Figure 3 will now be desirable to affect an understanding of the gating signals in relation to the control of the electron beam of the kinescope 14. The curves of Figure 3 are drawn with signal amplitude as ordinate and beam deflection as abscissa, as the beam deflection will be assumed for purposes of illustration to be constant in time, the abscissa may also be considered as a time plot. The curves of Figure 3 are superimposed upon a section of the image reproducing screen 17 of the tube 14 for purposes of illustration. The curves 70 and 72 are representative of gating signals which are twice the frequency of the first harmonic whereas the curves 68 and 69 are representative of gating signals of a frequency four times that of the first harmonic. Lines 74, 76, 78 and 80 represent the amplitude which must be attained by the respective gating signals in order to open the gate circuits to which they are individually applied. It may be seen that the gating signal shown in curve 68 for gating the red signal is so phase positioned as to open the gate circuit 20 during the interval when the electron beam impinges upon a red light producing element R on the screen 17. The curve 69 shows that the gate circuit 16 will be opened to allow the electron beam to be modulated with the green signal during the period when the beam impinges upon green light producing element G.

Due to the fact that the blue strip-like elements B of phosphor recur in the screen of the kinescope 14 only half as often as the green and red color producing strips, the gating signals shown in curve 70, for the blue signal, must be of only half the frequency of gating signals for gating the red or the green signals, shown in curves 68 and 69. The gating signal for the gating of the ultra-violet light producing signal, which is a substantially constant voltage, coincides in frequency with the gating signal necessary to gate the blue signal and is shown in curve 80.

The variable phase shifters 50, 52, 54, 56 are such as to incur sufficient delay to substantially correctly phase position the curves 68, 69, 70 and 72 as shown in Figure 3.

The particular color chosen to suffer in reproduction is blue because of the fact that the human eye has less acuity for the color blue, however, the particular arrangement of the color light producing elements is immaterial to this invention and could take any of a number of forms.

The curves 68, 69, 70 and 72 are so positioned in phase relationship during that substantially only a single of the gate circuits is open to allow the passage of one of the color representative signals to modulate the electron beam within the kinesope 14.

The portions of the first and second harmonic signals which pass through the rectifiers 45 and 46 to be subtracted by the subtractor circuit 48, from a restoration signal which is utilized to accurately control the phase shift circuits in accordance with the beam scanning.

Figure 4:
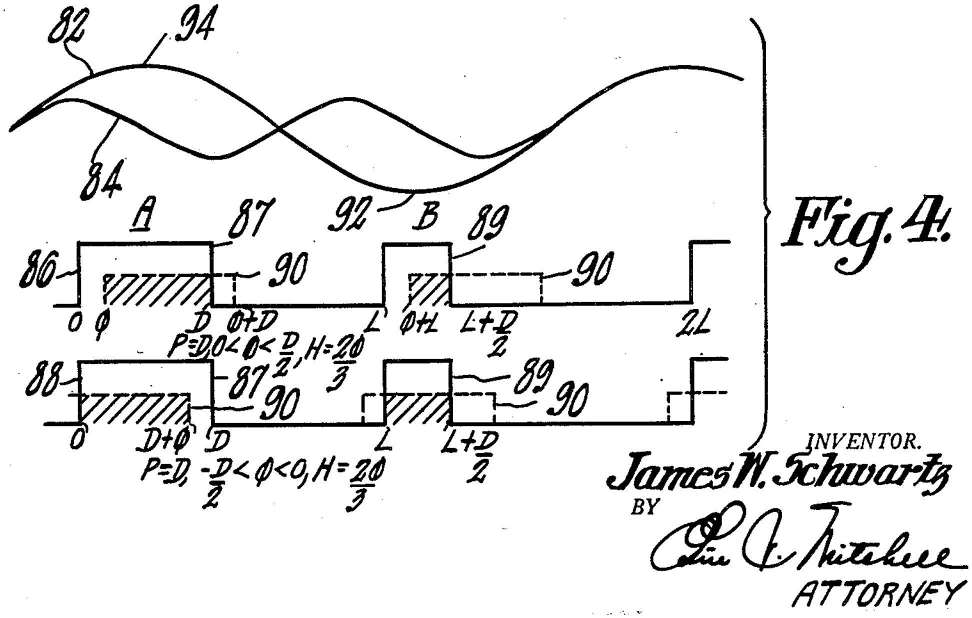
Figure 4 shows various other curves representing certain waveforms to be used in the explanation of the invention.

Referring now to Figure 4 there is shown a curve 82 which is representative of the first harmonic signal which passes through the filter 38. A curve 84 is representative of the second harmonic signal which passes through the filter 40. Curves 86 and 88 represent the idealized signal which would be generated by the ultra violet signal generating elements 66 and 64 by a constant amplitude scanning beam. The curves 86 and 88 thus consist of pulses 87 representative of the signal formed by the full width ultra violet prosphor elements 66 and of pulses 89 representative of the signal formed by the half width ultra violet signal generating element 64. The curves 90 are representative of the time periods during which the gate circuit 24 causes the electon beam to be modulated by a constan signal.

A brief non-mathematical analysis of the manner in which the restoration signal is formed will first be given, followed by a more detailed mathematical explanation.

In the event the phase of the gating signal is delayed, as shown by the curve 86, the generated signal will be time duration decreased. The signals so generated will be of a period which coincides to the overlapping of the curves 90 with curves portions 87 and 89 and is shown by the shaded areas. When the gating signal arrives late or is phase delayed, as shown with respect to the curve 86, it may be seen that the fundamental will remain of substantially constant amplitude. The lack of substantial variation of the fundamental signal is due to the fact that a portion of the signal generated while the fundamental is negative, during the half cycle 92, has been removed, and the same size portion of the signal which is generated while the fundamental is positive, at half cycle 94, has also been removed. The two portions thus removed will balance out, and the fundamental frequency signal will remain essentially unaffected. As to the effect on the second harmonic of the delayed gating signal as shown by curve 86, it may be seen that the second harmonic will drop in amplitude. The decrease of the second harmonic may be seen by considering that in effect the signal generated from the curve portion 87 of curve 86 will be shifted to the right thereby decreasing the second harmonic signal by shifting to some extent the center of the positive generated signal toward a negative half cycle of the second harmonic signal. The signal generated during the half width ultra violet strip represented by curve portion 89 will also have the center shifted to the right, thereby also tending to decrease the second harmonic signal in the same manner.

In view of the above it may be seen that when the gating is delayed or late as shown on curve 86, the first harmonic or fundamental signal remains constant, and, the second harmonic signal decreases.

A consideration of curve 88 with respect to the curves 82 and 84 will show that when the gating is early the first harmonic will drop in amplitude and the second harmonic will rise in amplitude. By comparing the first and the second harmonics, a signal may be generated which indicates whether the gating signal is arriving too late or too early.

The curve 88 is a representation similar to the curve 86, that is, the ideal signal which the ultra violet strip-like elements would generate if scanned by a constant intensity electron beam. The gating pulses 90 with respect to the curve 88 are shown to be arriving early or phase advanced. The advanced gating pulses shown with respect to curve 88 will cause the first harmonic to drop in magnitude, this may be seen by considering that the shaded area under curve 88 at the portion 87 will decrease, the shaded area represents positive signal during a period when the first harmonic signal is positive and to decrease the area is to decrease the first harmonic. The signal generated during curve portion 89 remains the same as if the gating pull were properly timed. The second harmonic signal will in this case, rise because the signal represented by the shaded area under curve portion 87 of curve 88 is in effect shifted to a position where a greater portion of it aids a positive half cycle of the second harmonic than detracts from a negative half cycle of the second harmonic signal. It may therefore be seen that if the second harmonic is subtracted from the first harmonic, in this case, the result will be a more negative quantity.

Consider now again that the gating signal is late in which case the fundamental remains constant and the second harmonic decreases, if the second harmonic is subtracted from the fundamental in this situation, the resultant restoration signal will be a more positive voltage than before due to the decrease in amplitude in the second harmonic. Now if the gating arrives too early in which event the first harmonic will decrease and the second harmonic will rise the restoration signal resulting from the subtraction of the second harmonic from the fundamental, will result in a more negative voltage. As the difference or restoration signal varies from more positive to more negative the degree of phase shift effected by the phase shift circuits 50, 52, 54 and 56 will vary in a commensurate manner to correct for variation.

The above analytical explanation of the formation of the restoration signal may be helpful in an analysis of the system, however, there is set out in detail below a mathematical explanation regarding the formation.

The operation of the automatic phase control circuits in the circuits for the tube 14 depend upon characteristics of the feedback signal from the photoelectric cell 28. It will be shown that the restoration signal may be obtained as a linear combination of any odd and any even harmonic of the control signal. Further the restoration signal varies piecewise linearly with the phase error and, in the case of small phase error, is proportional to it. The following notations will be used:

L is the half period of the system
D is the width of the full control strip
P is the scanning pulse width
$\phi$ is the phase error
$A_n$ are the Fourier coefficients of the waveform under consideration
H is the restoration signal
$t$ is time In calculation of the restoration signal it will be assumed that, $$\left(\frac{D}{L}\right)^2 << 1, \left(\frac{P}{L}\right)^2 << 1, \left(\frac{\phi}{L}\right)^2 << 1 \qquad (1)$$

and that the phase error is never large enough to produce zero overlap with any ultra violet strip.

Although square electron beam scanning pulses (which would exist only for an infinitely small electron beam) have been assumed it will be shown that this condition can be relaxed to a considerable extent.

Assume that $P=D$, the control strips and pulse have equal width. Since alternate control strips are only half as wide as the remainder we must in the analysis differentiate between negative and positive $\phi$. Assume also, $$0 < \phi < \frac{D}{2}$$

Curve 86 shows the relative positions of ultra violet strips or signals which could be generated therefrom 37 and 89 and pulse signals 90 for this case. The Fourier coefficients are given by an integration of the waveform over a complete cycle, i. e., $$A_n = \frac{1}{2L}\int_0^{2L} e^{-\frac{2\pi int}{2L}} F(t)\,dt$$

where F($t$) is either unity of zero, as shown in curve 86. Thus, $$A_n=\frac{1}{2L}\int_{\phi}^{D} e^{-\frac{2\pi int}{L}}dt+\frac{1}{2L}\int_{\phi+L}^{L+\frac{D}{2}} e^{-\frac{\pi int}{L}}dt$$

$$=\frac{i}{2\pi n}\left[e^{-\frac{\pi inD}{L}}+e^{-\frac{\pi in(L+D/2)}{L}}-e^{-\frac{\pi in\phi}{L}}-e^{-\frac{\pi in(\phi+L)}{L}}\right]$$

$$=\frac{i}{2\pi n}\left[e^{-\frac{\pi inD}{L}}e^{-\frac{\pi in\phi}{L}}+(-1)^n\left(-e^{\frac{\pi in\phi}{2L}}-e^{-\frac{\pi in\phi}{L}}\right)\right]$$

Using Equation 1 we get, $$A_n=\frac{i}{2\pi n}\left[1-\frac{\pi inD}{L}-1+\frac{\pi in\phi}{L}+(-1)^n\left(1-\frac{\pi inD}{2L}-1+\frac{\pi in\phi}{L}\right)\right]$$

$$=\frac{1}{2L}\left[\left(1+\frac{1}{2}(-1)^nD\right)-(1+(-1)^n)\phi\right]$$

This result can be obtained by inspection of curve 86. The first control pulse (shaded region) extends from $\phi+D$, thus contributed $(D-\phi)/2L$. The second pulse (shaded region) ranges from $\phi+L$ to $D/2+L$. The added L amounts to a multiplication by $(-1)^n$ since $(-in\pi)^n=(-1)^n$. Hence the second pulse contributes $(-1)^n(D/2-\phi)2L$. The sum of the contributions is the required result.

From the above, $$A_{2m}=\frac{1}{2L}\left(\frac{3D}{2}-2\phi\right) \text{ and } A_{2m+1}=\frac{1}{2L}\cdot\frac{D}{2}$$

thus the restoration signal is given by, $$H=2L\left(A_{2m+1}-\frac{1}{3}A_{2m}\right)=\frac{2\phi}{3}$$

that is, the restoration signal is obtained by subtracting one or more demodulated even harmonics from a 3 × amplified signal consisting of the same number of demodulated odd harmonics. Different combinations of odd and even harmonics obviously can be used in equivalent proportions. The amplifier circuits 42 and 44 of Figure 1, must be designed to amplify in the correct proportions.

The restoration signal developed by the subtractor circuit 48 will, when fed to the variable phase shifter circuits 50, 52, 54 and 56 affect the necessary additional phase shift to cause the gating voltages to be positioned as shown in Figure 3 with respect to time, which substantially coincides with the deflection of the scanning beam in the tube 14. It may therefore be seen that a fine control is developed which will tend to assure that during the time when the scanning beam impinges upon a particular color, the electron beam will be modulated with the signals representative of that particular color.

In another form of the invention the restoration signal may be utilized to deflect the beam position to correct for the color registry variations. That is, the system shown in Figure 1 indicates that the restoration signal is applied to the phase shift circuits to vary the time of occurrence of the interval of modulation of the electron beam with particular color signals, with respect to the position of the electron beam. In another form of the invention the restoration signal may be used to alter the position of the electron beam with respect to the interval of beam modulation with a particular color signal. The requirement is that the beam be modulated with a particular color signal at a particular point of beam deflection or at a particular beam position, it may therefore be seen that either the beam position or the interval of modulation may be altered with respect to the other to obtain a correct relationship.

Figure 5:
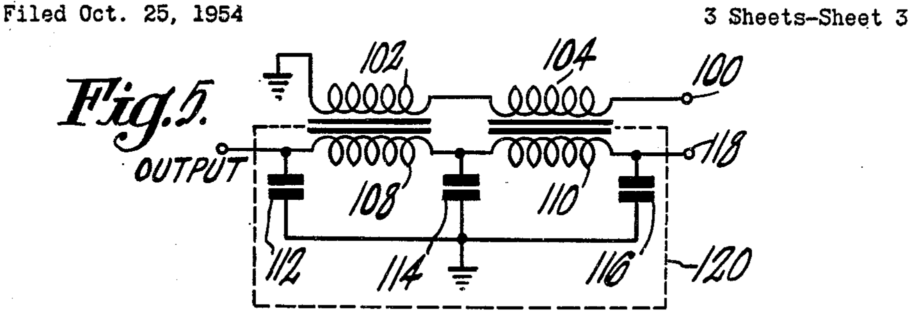
Figure 5 shows one form of a variable phase shifter which may be used in the system shown in the diagrammatic representation of Figure 1.

Figure 5 shows a form of a variable phase shifter which may be used as the variable phase shifter of the circuits 50, 52, 54, and 56. Terminals 100 is provided for receiving a direct current voltage which varies as the amount of shift desired or the restoration signal. The direct current voltage applied at the terminal 100 will pass through inductive elements 102 and 104. Inductive elements 102 and 104 are inductively coupled to inductance elements 108 and 110. The elements 108 and 110 form part of a delay line 120, which also consists of condensors 112, 114, and 116. An alternating current signal applied at the alternating current terminal 118 will be phase delayed by a predetermined amount on passing through the phase delay line 120. The application of a direct current voltage to the terminal 100 will vary the inductive reactance of the inductance elements 108 and 110 and will therefore vary the degree of phase shift affected by the delay line 120. It may therefore be seen that if the restoration signal is aplied to the terminal 100 and the gating signals are applied to the alternating current terminal 118, the restoration signal will vary the phase delay brought about in the gating signal by the delay line 120 according to the amplitude of the restoration signal.

Figure 6:
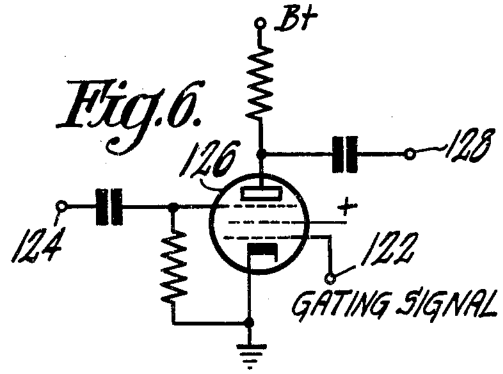
Figure 6 shows one form of a gate circuit which may be used in the system shown in the diagrammatic representation of Figure 1.

Figure 6 shows a form of a gating circuit which may be used as the gating circuits 16, 18, 20 or 24. A gating signal is applied at the terminal 122. The signal to be gated is applied at the terminal 124. Both terminals 124 and 122 are connected to current control grids of an electron discharge device 126. The current through the electron discharge device will therefore be controlled by the potential applied at terminals 122 and 124. The electron discharge device 126 is so biased that until the gating signal applied at terminal 122 reaches a predetermined amplitude, no signal will pass through the electron discharge device 126 and no alternating signal will appear at the output terminal 128. Upon the occurrence of a gating signal above a predetermined magnitude the electron discharge device 126 will become conducting however, the current through the device will be modulated in accordance with the signal applied to terminal 124. In this manner a video signal may be caused to periodically appear at the output terminal 128 upon the occurrence of a gating signal applied to terminal 122 of a predetermined amplitude.

The voltage supply to the photoelectric cell 28 of Figure 1 through the photoelectric cell voltage control circuit 32 from the voltage source 30 is controlled to maintain the control signals at essentially constant amplitude. In the event that the first harmonic of the control signal decreases in amplitude, the decrease will be sensed by the connection from the rectifier 44 to the photoelectric cell voltage control circuit 32, and the voltage to the photoelectric cell 28 will be increased in magnitude to cause the control signal to be increased in magnitude, thereby regulating the amplitude of the control signal.

Figure 7:
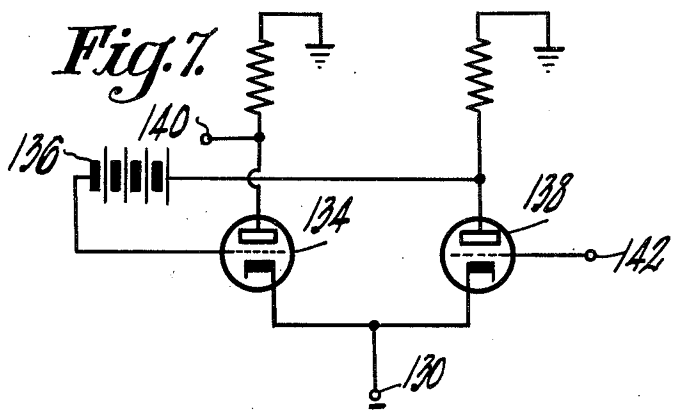
Figure 7 shows one form of a photoelectric cell voltage control circuit which may be used in the system shown in the diagrammatic representation of Figure 1.

Figure 7 shows a form of photoelectric cell voltage control circuit 32 which may be used in the system of Figure 1. Terminal 130 is adapted to be connected to a source of negative potential. The negative potential is coupled to the cathodes of electron discharge devices 134 and 138. The electron discharge device 134 has a control grid connected through a battery 136 to the plate of the electron discharge device 138. The electron discharge device 138 acts as a direct current amplifier and thereby controls the potential at the grid of the electron discharge device 134 in accordance with the magnitude of the input signal applied at a terminal 142. As the grid potential at the electron discharge device 134 varies, the output voltage appearing at terminal 140 will also vary. It may therefore be seen that the output potential appearing at terminal 140 will vary as the input signal variations applied to the electron discharge device 138 through input terminal 142, and the signal from the rectifier 44 from Figure 1 may be applied to the input terminal 142 to vary the phototube voltage control circuit, and thereby vary the voltage supplied to the photoelectric cell.

Having thus described the invention, what is claimed is:

1. A color television image reproducing system comprising an image screen having a plurality of light producing strip-like elements and a plurality of signal generating strip-like elements, said light producing strip-like elements being responsive to emit light energy when excited by electron beam energy, said signal generating strip-like elements being responsive to generate a control signal when excited by electron beam energy, said signal generating strip-like elements being of at least two different areas, means for forming an electron scanning beam for exciting said strip-like elements, controlled modulating means for intensity modulating said electron beam with different signals during different intervals of modulation, each of said intervals of modulation substantially coinciding in time with a particular impinging time interval when said electron beam excites certain of said strip-like elements, sensing means for sensing said control signal, filtering means for selecting certain frequency components of said control signal to generate frequency component signals, signal combining means for combining certain of said frequency component signals to form a restoration signal, varying means connected to receive said restoration signal, said varying means for varying said interval of modulation with respect to said impinging time interval according to said restoration signal.

2. A color television image reproducing system comprising an image screen having a plurality of light produring strip-like elements and a plurality of signal generating strip-like elements, said light producing strip-like elements being responsive to emit light energy when excited by electron beam energy, said signal generating strip-like elements being responsive to generate a control signal when excited by electron beam energy, said signal generating strip-like elements being of at least two different areas, means for forming an electron scanning beam for exciting said strip-like elements, controlled modulating means for intensity modulating said electron beam with different signals during different intervals of modulation, each of said intervals of modulation substantially coinciding in time with a particular impinging time interval when said electron beam excites certain of said strip-like elements, sensing means for sensing said control signal, filtering means for selecting certain frequency components of said control signal to generate frequency component signals, signal combining means for combining certain of said frequency component signals to form a restoration signal, switching means connected to said modulating means, said switching means being such as to vary the time of occurrence of said interval of modulation commensurate with said restoration signal.

3. A color television system comprising in combination an image target consisting of a plurality of light producing striplike elements, said light producing strip-like elements comprising groups of interlaid elements, each of said groups of elements for producing light within a particular range of wave lengths, means for generating an electron scanning beam for causing said strip-like elements to emit light as said electron scanning beam is deflected across said strip-like elements, at least one group of said strip-like elements having strip-like elements of at least two different areas, modulating means for modulating said electron scanning beam, controlled switching means for switching said modulating means such that said electron scanning beam will be alternately modulated by signals representative of the desired light to be produced within different particular ranges of wave lengths, means for generating a control signal which varies as the light emitted from said group of strip-like elements having strip-like elements of at least two different areas, means for isolating particular frequency components of said control signal, means for comparing certain of said particular frequency components with other of said particular frequency components to produce a restoration signal, means for applying said restoration signal to said controlled switching means such as to assure that said electron scanning beam is modulated by a signal representative of the light to be produced within a certain particular range of wave length as said electron scanning beam causes light emissions of light within said certain particular range of wave lengths.

4. A device according to claim 3 wherein said two different areas are of substantially the same height, and are of different widths.

5. A device according to claim 3 wherein said group of strip-like elements of at least two different areas comprise ultra-violet light emitting phosphor material elements.

6. A device according to claim 3 wherein said means for generating a control signal which varies as the light emitted from said group of strip-like elements having strip-like elements of at least two different areas comprises a photoelectric device being sensitive to generate a signal upon receiving ultra-violet light.

7. A color television image reproducing system comprising in combination an electron target having a plurality of light producing strip-like elements responsive to emit light energy when excited by electron beam energy, said image screen having a plurality of signal generating strip-like elements responsive to generate a control signal when excited by electron beam energy, alternate of said signal generating strip-like elements being of different areas from other of said signal generating strip-like elements, means for generating an electron scanning beam for scanning said strip-like elements, keying means adapted to be connected to sources of different signals, said different signals being representative of the desired light intensity to be produced by different of said light producing elements, beam intensity control means connected to said keying means, sensing means for sensing said control signal emitted from said signal generating strip-like elements, variable phase shift means connected to said sensing means for generating phase shifted keying signals from said control signal, said variable phase shift means being connected to said keying means such as to control the application of said different signals to said beam intensity control means, for modulating said electron beam sequentially with said different signals, means for isolating certain frequency components of said control signal to form particular frequency signals, means for combining said particular frequency signals to form a restoration signal, means for applying said restoration signal to said variable phase shift means for varying the phase shift effected by said variable phase shift means, controlling means for controlling said sensing means to vary the magnitude of said control signal, means connecting said controlling means to receive certain of said particular frequency signals to vary said control means.

8. A color television system comprising in combination an image screen consisting of a plurality of light producing strip-like elements, said light producing strip-like elements comprising groups of interlaid elements, each of said groups of elements for producing light within a particular range of wave lengths, means for generating an electron scanning beam for causing said strip-like elements to emit light as said electron beam is deflected across said strip-like elements, at least one group of said strip-like elements having strip-like elements of at least two different areas, and being composed of ultra-violet light emitting phosphor material, modulating means for modulating said electron scanning beam, controlled switching means for switching said modulating means such that said electron scanning beam will be alternately modulated by signals representative of the desired light to be produced within different particular ranges of wave lengths, a photoelectric device for generating a control signal which varies as the light emitted from said group of strip-like elements having strip-like elements of at least two different areas, means for isolating particular frequency components of said control signal, means for comparing certain of said particular frequency components with other of said particular frequency components to produce a restoration signal, means for applying said restoration signal to said controlled switching means such as to assure that said electron scanning beam is modulated by a signal representative of the light to be produced within a certain particular range of wave length as said electron scanning beam causes light emission of light within said certain particular range of wave lengths, means for sensing the magnitude of said control signal, means for varying the current in said photoelectric device according to the magnitude of said control signal.

9. In a color television system embodying a color kinescope having a target screen formed of groups of strip-like elements, each strip-like element of particular groups of striplike elements for producing light within a particular range of wave lengths when excited by electron beam energy, each strip-like element of at least one other group of strip-like elements for producing a control signal when excited by an electron beam, said other group of strip-like elements having strip-like elements of at least two different widths, means for generating an electron beam for exciting said strip-like elements, beam modulating means for modulating said electron beam alternately with different signals for each of said groups of strip-like elements, means for controlling said beam modulation means, means for sensing said control signal, means for selecting certain frequency components from said control signal to form first and second particular frequency signals, said first particular frequency signals comprising at least one even harmonic component of said control signal, said second particular frequency signals comprising at least one odd harmonic component of said control signal, means for comparing said first particular frequency signal with said second particular frequency signal to form a restoration signal, means for coupling said restoration signal to said means for controlling said beam modulating means such as to cause said electron beam to be modulated with a signal representative of light within a particular range of wave lengths at a predetermined time.

10. A color television image reproducing system comprising in combination a target having a plurality of groups of vertical strip-like sections, each group of vertical strip-like sections limited in its light representations to one different selected range of wave lengths, one particular group of said vertical strip-like sections having vertical strip-like sections of at least two different widths, each of said different widths of strip-like sections occurring alternately on said image screen, an electron scanning beam for developing an image on said screen by a scanning operation, said electron scanning beam having an intensity control electrode, means for developing a control signal upon said electron scanning beam scanning said particular group of said vertical strip-like sections, frequency selective means for selecting certain frequency component signals from said control signal, means for generating a plurality of light producing signals, each of said light producing signals being such as to produce a particular signal of light within a particular range of wave length on said screen when modulated on said electron scanning beam, a variable phase delay means for forming a plurality of different phase delayed signals from said certain frequency components signal, gating circuit means for repeatedly gating said light producing signals to be applied to said intensity control electrode, means operatively connecting said phase delayed signals to said gating circuit, means for controlling said gating circuit means, means for selecting a multiplicity of frequency component signals from said control signal, means for combining said multiplicity of frequency component signals to form a restoration signal, means operatively connecting said restoration signal to said variable phase delay means to vary the phase relationships of said phase delayed signals.

11. Apparatus according to claim 10 wherein one of said light producing signals for producing a particular signal of light within a particular range of wave length comprises a substantially unvarying signal.

12. An electron sensitive color screen comprising a foundation having a multiplicity of groups of phosphor coated elemental areas on a surface thereof, said elemental areas each being constituted essentially of a phosphor material capable of emitting light within a particular range of wave lengths individual to that particular group of elemental areas, one particular group of said elemental areas having vertical strip-like elemental areas of at least two different widths, each of said different widths of said particular strip-like sections occurring alternately on said surface of said color screen.

13. Apparatus according to claim 11 wherein said particular group of said vertical strip-like elemental areas comprises vertical strip areas of two different widths, one of said widths being susbtantially twice another of said widths.

14. Apparatus according to claim 13 wherein said particular group of said vertical strip-like elemental areas are separated from said other groups of elemental areas by a light reflecting, electron transparent layer.

15. An electron sensitive color target comprising a foundation having a multiplicity of groups of strip-like elements positioned on a surface thereof, certain of said strip-like elements being constituted of a material capable of emitting light within a particular range of wave lengths individual to that particular group of elemental areas, other of said strip-like elements being constituted of a material for forming a control signal upon being excited by an electron beam, said other of said strip-like elements being of at least two different widths, each of said different widths of said other of said strip-like elements occurring alternately on said surface of said screen.

References Cited in the file of this patent

UNITED STATES PATENTS

| | | |
|---|---|---|
| 2,674,651 | Creamer | Apr. 6, 1954 |
| 2,689,269 | Bradley | Sept. 14, 1954 |